United States Patent [19]
Lorenz et al.

[11] Patent Number: 5,473,604
[45] Date of Patent: Dec. 5, 1995

[54] METHOD FOR AVOIDING NODE OVERLOAD IN A PACKET SWITCHING NETWORK

[75] Inventors: Diana L. Lorenz, Naperville, Ill.; Robert F. Shaw, Clinton, N.J.; Ronald A. Spanke, Wheaton, Ill.

[73] Assignee: AT&T Corp., Murray Hill, N.J.

[21] Appl. No.: 342,548

[22] Filed: Nov. 21, 1994

[51] Int. Cl.⁶ .............................. H04J 3/26; H04L 12/56
[52] U.S. Cl. ..................... 370/60; 370/85.4; 370/94.1
[58] Field of Search .......................... 370/18, 60, 60.1, 370/61, 79, 84, 85.1, 85.4, 94.1, 94.2

[56] References Cited

U.S. PATENT DOCUMENTS 4,866,702  9/1989  Shimizu et al. ........................... 370/60
4,901,348  2/1990  Nichols et al. ........................ 370/60 X
5,243,596  9/1993  Port et al. .............................. 370/94.1

Primary Examiner—Melvin Marcelo
Attorney, Agent, or Firm—Michael B. Johannesen

[57] ABSTRACT

A system and method that controls node congestion in a packet switching network by allowing the congested node to seize control of transmission on the packet switching network and not relinquishing control until it has drained its buffer of the backlog of packets. In response to the node's buffer reaching a predetermined occupancy level, the node requests from the network's arbiter for exclusive transmission rights on the network. When the node receives transmission rights, the node continues to process packets in the buffer. When the occupancy of the buffer reaches a second predetermined threshold, the node releases the transmission right, and thus permits other nodes to transmit packets to it (and to other nodes) again.

11 Claims, 4 Drawing Sheets

METHOD FOR AVOIDING NODE OVERLOAD IN A PACKET SWITCHING NETWORK

TECHNICAL FIELD

This invention relates to the field of packet switching networks, and, more specifically, to the area of controlling congestion in packet switch nodes that receive more packets that they can process during a given time interval.

BACKGROUND OF THE INVENTION

Packet switching networks are being used in more and more applications to provide communications among distributed processors, wherein the sum total of the processors can provide more processing power than any one large processor. Increasingly, these processing networks communicate with other processing networks to further distribute the processing load, and for other reasons. Such inter-network communication is provided by a "gateway" in each system whose job it is to send and receive messages over the communications media connecting it to another gateway, and to perform any translation of protocol necessary for transmission on the gateway's network (referred to as the "home" network).

Today's packet switching networks continually increase in network speed as new technology becomes available. However, gateways generally have a throughput bandwidth (i.e., the speed at which the gateway can perform the protocol and/or data format changes) less than the speed of its home network. Further, the speed of the interconnection medium is frequently far less than the speed of the network. As a result, if there are many messages going from the network to the gateway, the gateway becomes overloaded.

In the prior art, the problem of gateway overload is usually addressed by providing the gateway with a very large receive buffer, by the gateway dropping messages when it becomes overloaded, or both. Gateways with very large receive buffers are expensive both in cost of the buffer and the system needed to maintain such a large buffer. Dropping messages is generally an acceptable solution only for those applications that use a level two or level three protocol. In these protocols, the sender waits for an acknowledgment back from the receiver, otherwise the sender sends the message again. Such solutions are appropriate for data or low speed applications, but not for high speed data transmission or low latency applications, such as packetized voice. Handshake protocols not only slow transmission down, but in many applications, the acknowledgment and retransmission protocols cannot be used, due to the low latency requirements. In these applications, dropping messages may be catastrophic.

FIG. 1 illustrates an example of packetized voice transmission which requires such low latency. FIG. 1 is a block diagram of a code division multiple access (CDMA) wireless telephone switching system covering a wide geographical area. A CDMA system transmits/receives voice or data at the relatively slow rate of approximate 8 Kbps between a mobile unit 54 and a cell site such as 39 over a spread spectrum signal. A transceiver at the cell site sends/receives the spread spectrum signal and translates the content of the signal into packets. A speech processor (SP) then translates the packets into a digital 64 Kbps pulse code modulated (PCM), as used in standard digital switching. CDMA cellular communication is more fully described in "The Wideband Spread Spectrum Digital Cellular System Dual-Mode Mobile Station-Base Station Compatibility Standard," "CDMA Digital Common Error Interface Standard," revision 1.0, October, 1990, and "An Overview of the Application of Code Division Multiple Access to Digital Cellular Systems and Personal Cellular Networks," May 21, 1992, available from Qualcomm, Inc.—10555 Sorrento Valley Road—San Diego, Calif.

In most CDMA system designs, the speech processor is at the cell site. However, in this illustrated embodiment, the speech processor is on a packet switch, (such as 47, 147, and N47), connected to the cell site and the data received at the transceiver is packetized and then sent through a packet network to the designated speech processor. A system and method for such packetization and routing through the packet networks is described in U.S. patent applications Ser. Nos. 08/040,819 and 08/040,818, assigned to the assignee of this invention, which are incorporated herein by reference.

In this exemplary embodiment, wireless telephone (not shown) 50 in car 54 initiates a call to telephone 100, when car 54 is in cell 5, connected to packet switch 47. Packet handler (PH) 55 receives packets from cell 5 and sends them on bus 61 to speech processor (SP) 57, which connects the call to and from public switched telephone (PSTN) 3 and, thus, to telephone 100. As mobile 54 moves from cell 5 to cell 7, an executive call processor (EPC) network (not shown for clarity in this figure but well known in the art) informs cell site 7 of the SP 57 handling the call. As wireless telephone 54 moves into the boundary area between cells 7 and 9, packet handlers 53 and 54 both send packets on bus 61 to speech processor 57. Speech processor 57 continues to be the only connection to PSTN network 3 and, thus, to telephone 100 for this call. Wireless telephone 54 then moves fully into cell 9, and only packet handler 51 sends packets to speech processor 57.

Wireless telephone 54 then moves from cell 9 into adjoining cell 25, which is serviced by packet handler 155, and packet switch 147. Cell 25 sends packets to packet handler 155, which places them on packet bus 161. Gateway 202 recognizes that the address is not for a member of the packet bus 161 community, encapsulates the packets with ATM protocol, as described in the above-referenced patent applications, indicating the destination community, and sends them through self-routing asynchronous transfer mode (ATM) network 400. Self-routing ATM network 400 examines the address and routes the cells to the appropriate gateway, which in this case is gateway 200, since the cells are destined for packet bus 61 and speech processor 57. Encapsulated packets arrive at gateway 200 in packet switch 47, are reassembled, and put on packet bus 61 to speech processor 57.

Similarly, when wireless telephone 54 moves through cells 35, 37, 39, and all intervening cells, all packets are sent to/from speech processor 57, since all of the packet switches are connected to ATM network 400. Thus, the call from speech processor 57 through PSTN 3 to telephone 100 does not have to be torn down as wireless telephone 54 traverses cell and switch boundaries. Therefore, no hard hand-off ever takes place throughout the entire network. An entire metropolitan area may be connected in this manner, with all cellular switches connected to one ATM network.

In the above example, only one wireless telephone is shown. In reality, there are many wireless devices, all sending calls to speech processors which are not necessarily on the same packet switch. Therefore, more packet handlers send packets to speech processors that are not on the same packet switch and, thus, send more traffic through their respective gateways 200 and 202, than they send to a destination on their own packet bus. So, for example, if there are 50 speech processors in the packet switch network of FIG. 1 equally distributed among five switches, then only one fifth (on the average) of all packets will be handled in the same packet switch. That means four fifths of the packet traffic will be sent through gateways. Additionally, CDMA packet traffic is packetized voice samples which are very time sensitive. If these packets are not delivered at a nearly steady rate, the call will be torn down. Thus, gateways 200 and 202 must have some method to avoid being overloaded by heavy time-sensitive packet traffic being sent to other switches.

Therefore, a problem in the art is that there is no system and method for preventing gateways from becoming overloaded when the nodes on the gateway's network are sending many messages to other networks.

SUMMARY OF THE INVENTION

This problem is solved and a technical advance is achieved in the art by a system and method that controls node congestion in a packet switching network by the congested node seizing control of transmission on the packet switching network and not relinquishing control until it has drained its receive buffer of the backlog of packets. Congestion is controlled at the congested node because no other node in the network can transmit packets to it; thus the congested node can guarantee that it will not continue to become overloaded to the point that it must drop packets. The packet network therefore does not require protocols that add to overhead, and will not cause disruption of high speed packet delivery on the average.

These results are achieved by a method operative in a gateway or other node on a network, wherein the node receives a large portion of the packet traffic on the network. In response to the node's receive buffer reaching a predetermined occupancy level, the node requests the network's arbiter for transmission rights on the network. Advantageously, the predetermined occupancy level is determined so that there is enough space left in the receive buffer for worst-case packet delivery to the buffer before the node receives transmission rights. During all this time the node is still processing packets out of its receive buffer.

When the node receives transmission rights from the arbiter, the node continues to process packets from the receive buffer. Advantageously, the node can also transmit any packets that it has to send on the packet network, but does not give up transmission rights when it is finished transmitting. This system will not continue to add congestion to the overloaded node, since any packets that it transmits are destined for other nodes in the system. Only when the occupancy of the receive buffer reaches a second predetermined threshold does the node release the transmission right, and thus permit other nodes to transmit packets to it (and to other nodes) again.

BRIEF DESCRIPTION OF THE DRAWINGS

A more complete understanding of the invention may be obtained from consideration of the following description in conjunction with the drawings, in which.

DETAILED DESCRIPTION

Figure 1:
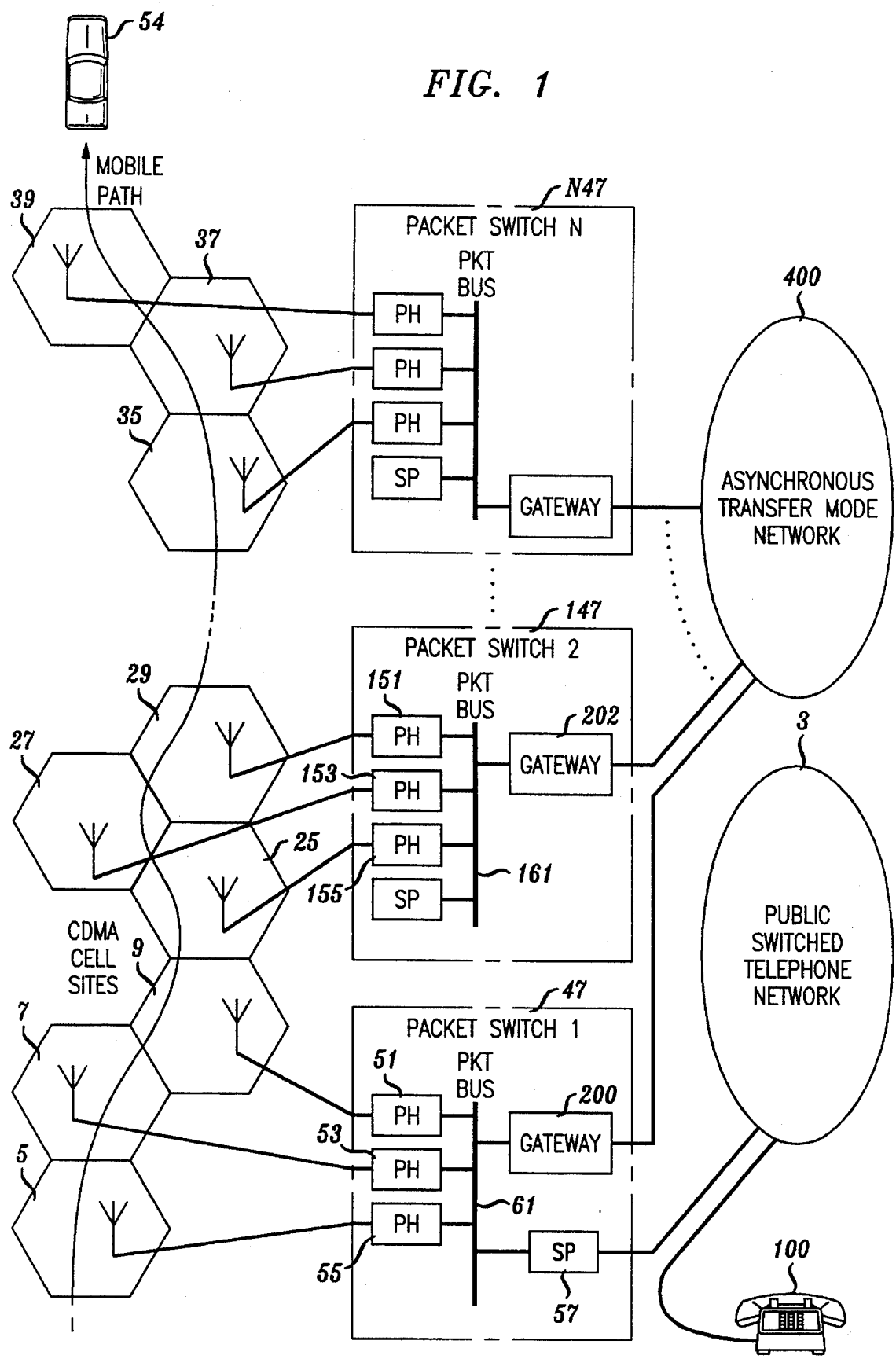
FIG. 1 is a block diagram of a code division, multiple access wireless telephone communications network wherein a plurality of switches within a metropolitan area are connected to each other by gateways incorporating an exemplary embodiment of this invention.
Figure 2:
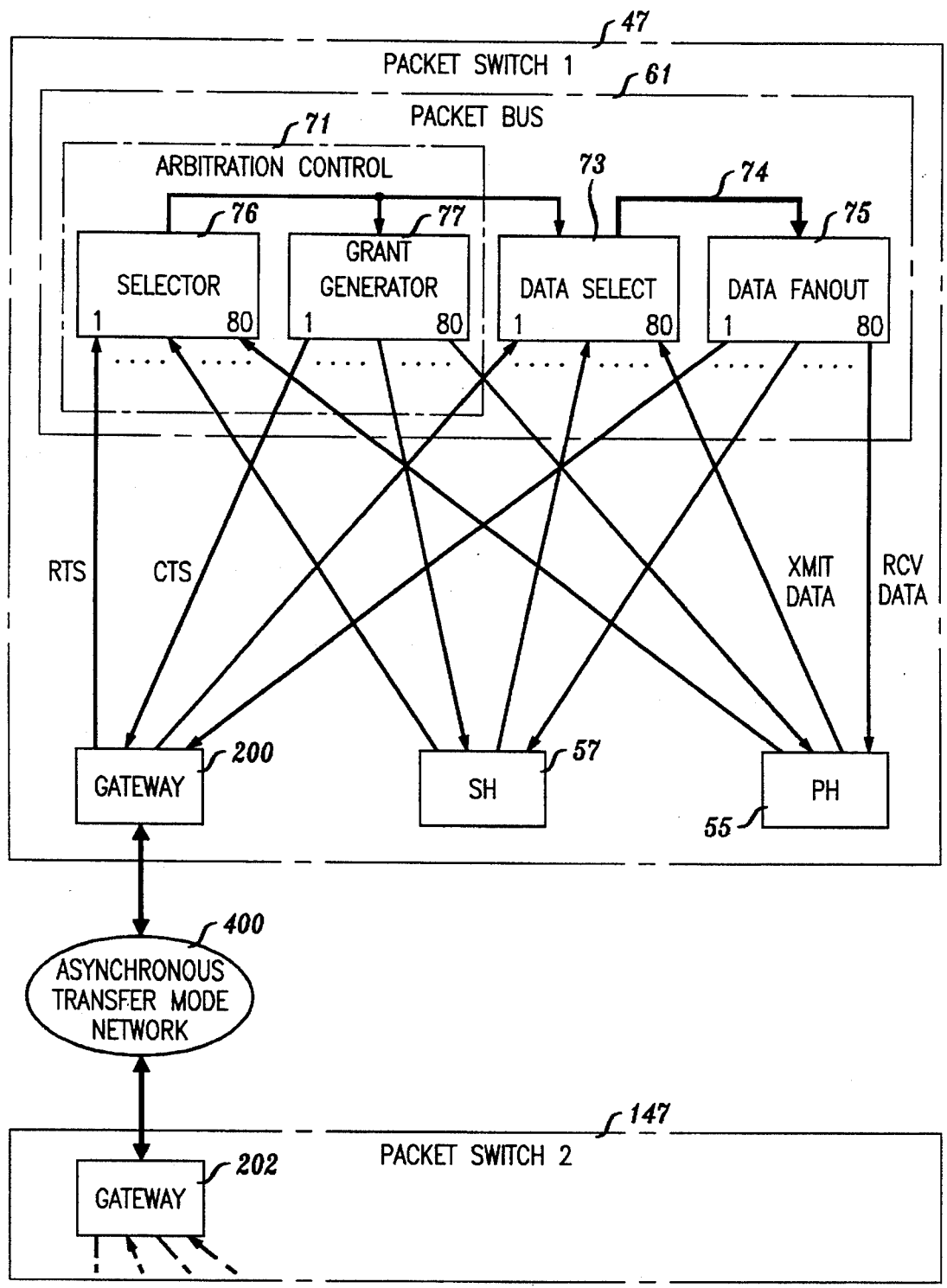
FIG. 2 is a block diagram of an exemplary packet network from FIG. 1.

Turning now to FIG. 2, a packet switch unit 47 is shown in which an exemplary embodiment of this invention prevents such gateway from becoming overloaded. Packet switch 47 is connected to ATM network 400 and, via the ATM network, to other packet switches, such as packet switch 147, via gateway 200. As in FIG. 1, packet switch unit 47 comprises a plurality of speech handlers represented by speech handler 57 and a plurality of packet handlers represented by packet handler 55. There is also a gateway 200, according to an exemplary embodiment of this invention, as will be described further below in connection with FIG. 3. According to a preferred embodiment of this invention, there may be up to 80 different units in packet switch 47.

Packet bus 61 is shown in more detail in FIG. 2. Packet bus 61 comprises arbiter 71, data select 73 and data fanout 75. Arbiter 71 maintains orderly transmission access to the units by determining which unit has the right to transmit packets. Data select is under control of arbiter 71 and selects data from one of the units connected to packet bus 61, depending on which unit arbiter 71 granted transmission rights. Data is then moved from data select 73 over bus 74 to data fanout 75. Data fanout 75 broadcasts data passed to it from data select 73 to all units connected to packet bus 61. If a unit recognizes that the address in the data packet is for that particular unit, the unit receives the data and puts it into a receive buffer (as will be described below). If the unit sees that the address is not for that unit, the unit ignores the packet.

Arbiter 71 comprises two basic units, a selector 76 and a grant generator 77. Selector 76 receives transmission right requests from all of the units connected to packet bus 61 and selects one of those units according to an algorithm. The algorithm selected is not important to this invention, as it may be any algorithm, such as round-robin, token ring, priority select, etc. In this exemplary embodiment, a token ring is used. In token ring selection, each unit is sequentially given an opportunity to "seize" the token. A unit that has a packet to transmit on bus 61 will issue a request to send (RTS) signal to selector 76. Selector 76 passes the token among all units connected to it. The next unit with its RTS signal active "seizes" the token. Selector 76 will then select that particular unit to be granted the transmission right. After the unit has transmitted its packet, a predetermined number of packets or all packets, the unit gives up the token by inactivating its RTS signal, whereby the next unit may seize the token.

When selector 76 has made its selection, it informs grant generator 77. Grant generator 77 generates a grant signal which is sent to the selected unit to indicate that the selected unit may broadcast on packet bus 61. Selector 76 also transmits its selection to data select 73, so that it may configure itself to receive data from the selected unit.

As seen in FIG. 1, packet handlers 55 will generally outnumber speech handlers 57 and will certainly outnumber gateways, such as 200. Packet handlers 55 send packets anywhere in the system for call handling. As shown above, gateway 200 will receive the majority of packets transmitted on packet bus 61. Also, due to the time-sensitive nature of the CDMA transmissions, it is very important that gateway 200 handle all packets in a timely manner without dropping any packets, which would cause unacceptable tear down of in-progress calls. Thus, acknowledgment and retransmission protocols must be avoided.

Figure 3:
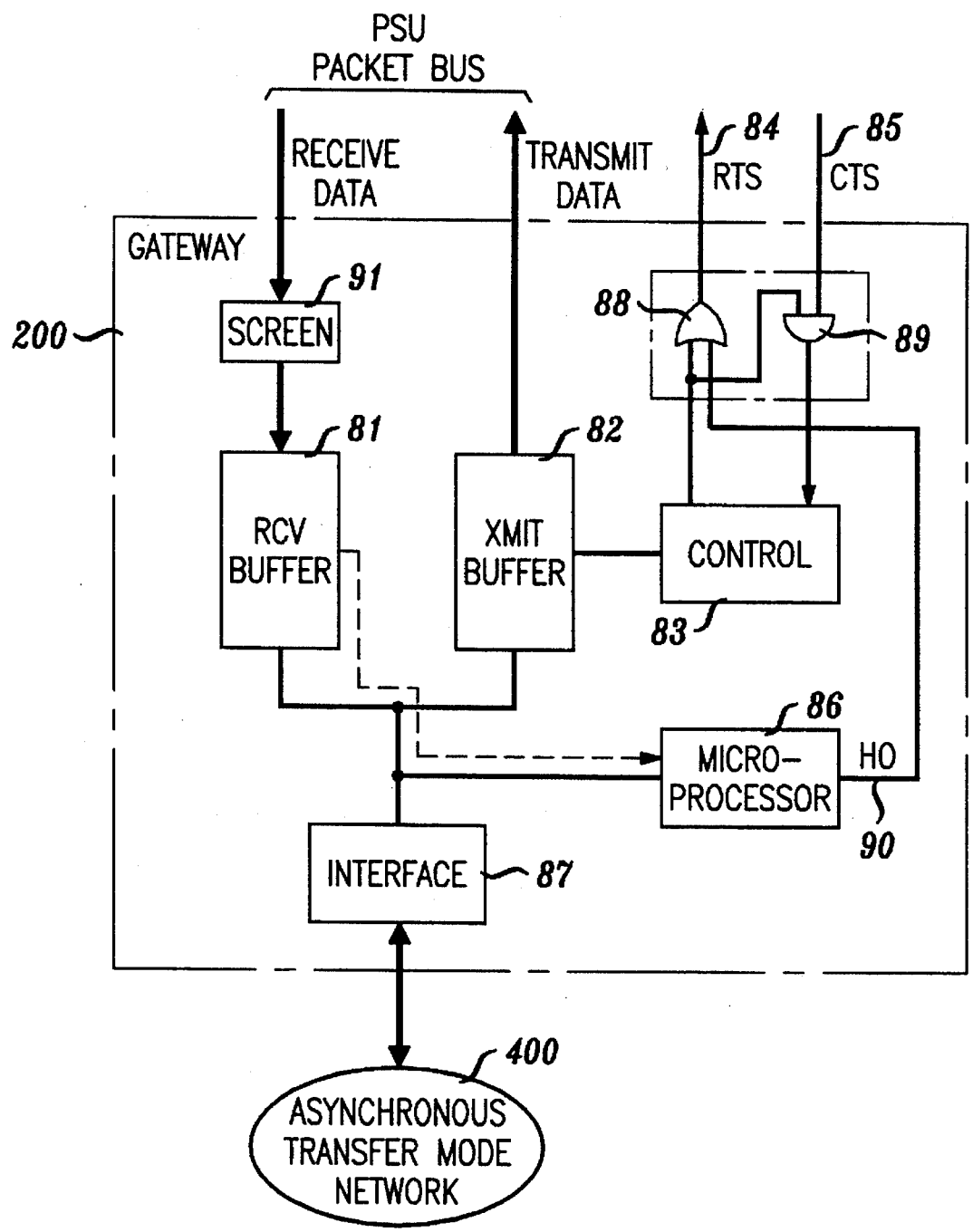
FIG. 3 is a block diagram of a gateway incorporating an exemplary embodiment of this invention connected to the packet network of FIG. 2.

Turning now to FIG. 3, gateway 200 is illustrated in a block diagram, according to an exemplary embodiment of this invention. Gateway 200 includes a receive buffer 81 for receiving packets from the packet bus, and a transmit buffer 82 for storing packets before they are transmitted to the packet bus. Gateway 200 also includes a control circuit 83 connected to transmit buffer 82 which determines when the transmit buffer has one or more packets to transmit. When control 83 determines that there is a packet to transmit in transmit buffer 82, it asserts a request-to-send (RTS) lead 84 which is connected to selector 76 (FIG. 2). When selector 76 grants the request to gateway 200, grant generator 77 asserts a signal on the clear-to-send (CTS) line 85. This clear-to-send signal is received at control 83 which causes transmit buffer 82 to transmit one or more packets to the packet bus. When the packet or packets have been transmitted, control 83 deactivates the RTS signal and, thus, relinquishes its transmission rights.

Receive buffer 81 receives packets from data fanout 75 (FIG. 2), through screen 91. Screen 91 monitors the address of received packets and only allows packets with the address of gateway 200 to pass to receive buffer 81. Microprocessor 86 then causes packets in receive buffer 81 to be moved into interface 87, which in this embodiment is an ATM interface that prepares the data for transmission on ATM network 400. Interface 87 also receives data from ATM network 400, removes the ATM encapsulation information, and reassembles packets (if they are larger than the ATM payload). Microprocessor 86 then causes packets to be moved from interface 87 to transmit buffer 82.

As stated above, the architecture of packet switch 47 (FIG. 2), and network (FIG. 1) tend to cause receive buffer 81 of gateway 200 to become instantaneously overloaded. In order to prevent such overload, receive buffer 81 is also connected to microprocessor 86, according to an exemplary embodiment of this invention. Microprocessor 86 senses when the number of packets in receive buffer 81 reaches a first predetermined level and then asserts the hold-off (HO) signal on lead 90, which causes the RTS signal on line 84 to be asserted. This trigger level may be calculated to prevent the buffer from overflowing. That is, this trigger level should be less than the maximum possible number of additional packets that may be received after microprocessor 86 causes the hold-off (HO) signal 90 to be asserted and before the clear-to-send signal on line 85 is received.

As stated above, when microprocessor 86 determines that receive buffer 81 is at or above its predetermined threshold, microprocessor 86 sends a hold-off signal 90. Microprocessor 86 continues to assert the hold-off signal 90 until the number of packets in receive buffer 81 are less than or equal to a second predetermined number. This second predetermined number may be the same as the first. Thus, as long as receive buffer 81 has more than the first predetermined level, microprocessor 86 will assert the hold-off signal 90, which causes the RTS signal 84 to be asserted.

Microprocessor 86 continues to process packets from receive buffer 81 through interface 87. Microprocessor 86 does not release the hold-off signal 90 until the number of packets is less than or equal to a second predetermined threshold. In this manner, no other packets may be sent to gateway 200 (after gateway 200 receives its clear-to-send signal) because gateway 200 itself is holding on to the packet bus 61. Therefore, the number of packets in receive buffer 81, by definition, will not continue to increase, and cannot overflow and, thus, no packets will be lost. Additionally, this system will cause only minimal backups in the transmit buffers of the other units connected to packet bus 61, because the amount of time that gateway 200 holds onto the transmit grant to empty its receive buffer 81 will be minimal. Each node has direct control of its own transmit buffer and will not continue to generate packets if its own transmit buffer fills up. In addition, packet buffering is essentially shared between the transmit buffers of all nodes on the system, rather than being concentrated in the receive buffer of the overload node, as in the prior art. However, far less buffering is required in the transmit buffers of other nodes with this invention than would have been required if copies of packets were held for retransmission until an acknowledgment was received.

Transmission buffer 82 may have packets to transmit at times when microprocessor 86 is not asserting a hold-off signal. To this end, OR gate 88 is added to control 83, according to this exemplary embodiment, so that either microprocessor 86 or control 83 may assert a signal on the request-to-send line 84. Additionally, AND gate 89 is used so that when transmit buffer 82 has packets to send while microprocessor 86 is holding on to the request to send lead 84, control 83 sees the clear-to-send signal on line 85. Control 83 will only transmit when it has something to transmit, and thus, not flood packet bus 61 with bad data.

Figure 4:
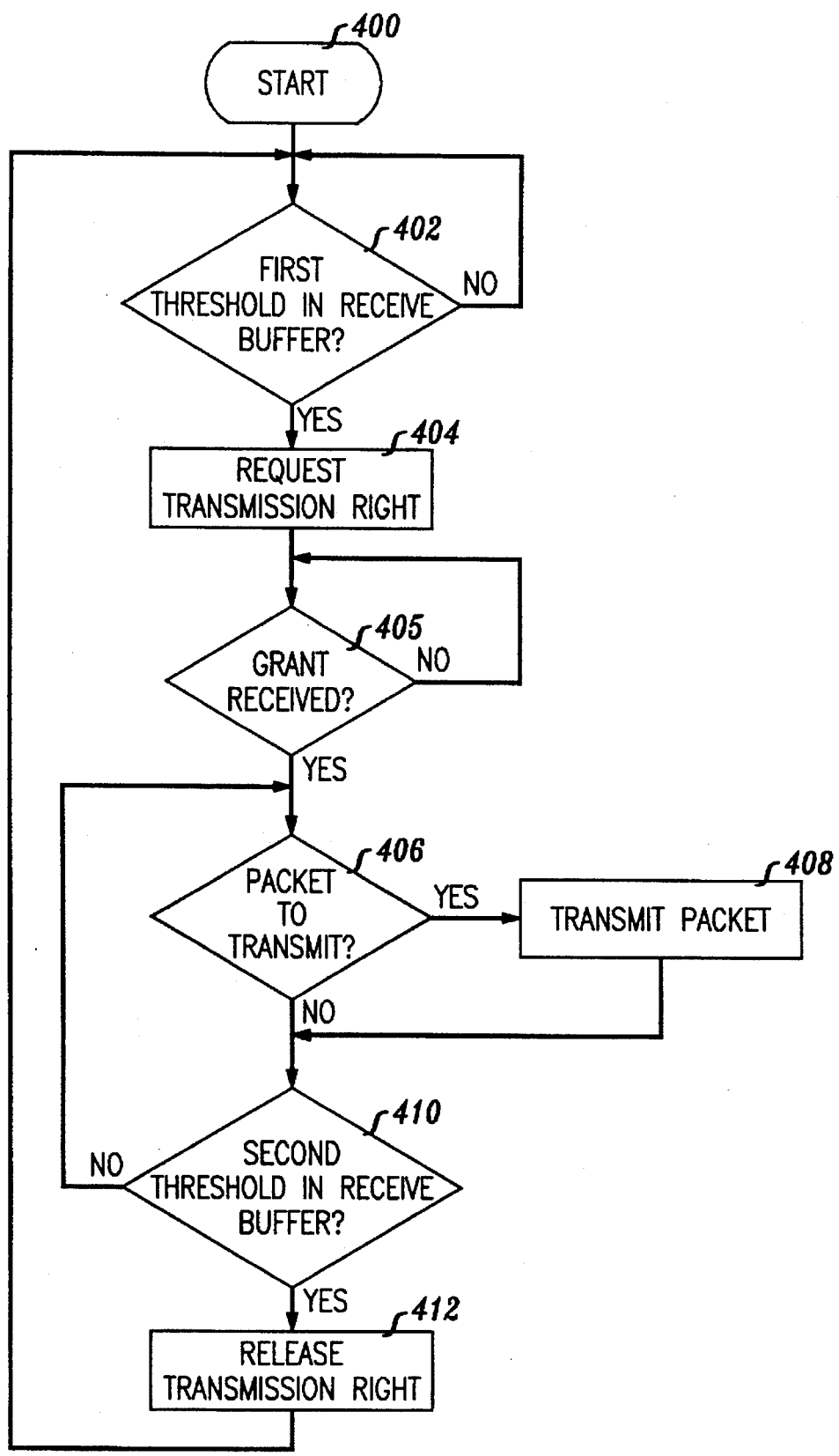
FIG. 4 is a flow chart of the operation of the gateway of FIG. 3.

Turning now to FIG. 4, a flow chart of the operation of gateway 200 is shown. Processing starts at 400 and proceeds to decision diamond 402. In decision diamond 402, a determination is made whether there are a number of packets greater than or equal to the first threshold in the receive buffer. If there are not, then processing returns back to decision diamond 402. If, in decision diamond 402, there are a number of packets greater than or equal to the first threshold, then processing proceeds to action box 404, wherein gateway 200 requests the transmission right from the arbitration control 71. Processing continues to decision diamond 405, where a determination is made whether gateway 200 has been granted transmission rights. If not, then processing returns back to decision diamond 405. When the transmission right is granted, processing continues to decision diamond 406 to determine whether the gateway 200 has one or more packets to transmit. If there are packets to transmit, then processing proceeds to action box 408 where one packet is transmitted.

Processing proceeds from both decision diamond 406 and action box 408 to decision diamond 410, where a determination is made whether there have been sufficient packets processed from the receive buffer such that the number of packets in the receive buffer are less than or equal to a second threshold. If there are not, then processing proceeds back to decision diamond 406. If there are fewer packets in the receive buffer than the second threshold, then processing proceeds to action box 412 where the transmission right is released. Processing then returns to decision diamond 402.

It is to be understood that the above-described embodiment is merely an illustrative principle of the invention and that many variations may be devised by those skilled in the art without departing from the scope of the invention. Other types of networks besides packet switches may use this embodiment of this invention without departing from this invention. For example, applicants' invention will work on a local area network regardless of the priority scheme. It is, therefore, intended that such variations be included within the scope of the claims.

We claim:

1. A method for controlling node congestion in a packet switching network, said packet switching network having a plurality of nodes capable of transmitting and receiving packets on said network, said packet switching network having an arbitration mechanism to determine which one of said plurality of nodes may have transmission rights on said network at a given time, said plurality of nodes includes a first node having a receive buffer for receiving packets at the transmission rate of said network, said first node removing and processing packets from said receive buffer at a rate lower than said transmission rate of said network, said method comprising the steps of:

said first node monitoring the occupancy of its respective receive buffer;

when the occupancy of said receive buffer in said first node exceeds a first predetermined threshold, said first node requests said arbitration mechanism for transmission right on said network;

upon being granted said transmission right, said first node holding onto said transmission right while continuing to process packets from said receive buffer; and upon reaching a second predetermined occupancy threshold in said receive buffer, said second predetermined occupancy threshold being less than or equal to said first predetermined threshold, said first node releasing said transmission right.

2. A method according to claim 1 wherein, when said first node has said transmission right and said first node has packets to transmit, said first node transmitting packets until there are no more packets to transmit.

3. A method according to claim 1 wherein, when said first node has said transmission right and said first node has packets to transmit, said first node transmitting said packets until said second predetermined occupancy threshold is reached in said receive buffer.

4. A method according to claim 1 wherein said arbitration mechanism for transmission rights comprises a token passing system, said step of requesting transmission rights comprises waiting for said token, and said step of holding said transmission rights comprises keeping said token even if there are no packets to transmit.

5. A method according to claim 1 wherein said network comprises a bus and said arbitration mechanism for transmission rights comprises a bus arbiter which grants specific transmission rights to one node at a time, said step of requesting transmission rights comprises sending a bus request signal to said bus arbiter, said method further comprising the step of said arbiter sending a bus grant to said first node, and said step of holding onto said transmission right comprises continuing to send said bus request signal and said step of releasing said transmission right comprises releasing said bus request signal.

6. A node apparatus in a packet switching network, said node being connected as one of a plurality of nodes to said network, said nodes communicating via packets, said network including an arbiter for determining which one of said plurality of nodes may transmit one or more packets on said network at a given time, said node apparatus comprising:

a receive buffer for holding packets received from said network but not yet processed;

first means for determining when said receive buffer exceeds a first predetermined occupancy from packets waiting to be processed;

means connected to said first determining means for requesting transmission rights from said network arbiter;

second means for determining when said receive buffer falls below a second predetermined occupancy of packets waiting to be processed; and means connected to said second determining means for releasing said transmission right.

7. A node apparatus according to claim 6 further comprising:

a transmit buffer for holding packets to be sent on said network; and means for transmitting said packets on said network before said releasing means releases said transmission right, wherein said releasing means does not release said transmission right if said transmitting means runs out of said packets to transmit unless said second determining means determines that said receive buffer occupancy is lower than said second predetermined occupancy level.

8. A node apparatus according to claim 6 wherein said network arbiter comprises a token ring system and said means for releasing said transmission right releases said token.

9. A packet switching network comprising:

a packet transport medium;

a plurality of nodes connected to said packet transport medium, said plurality of nodes communicating with each other by sending packets on said packet transport medium;

a bus arbiter for determining which of said plurality of nodes may transmit one or more packets on said packet transport medium at a given time; and one or more of said nodes having a receive buffer for holding packets received from said transport medium but not yet processed, first means for determining when said receive buffer exceeds a first predetermined occupancy of number of packets waiting to be processed, means connected to said first determining means for requesting transmission rights from said bus arbiter, second means for determining when said receive buffer falls below a second predetermined occupancy of packets waiting to be processed and means connected to said second determining means for releasing said transmission fight.

10. A packet switching network according to claim 9, wherein said one or more nodes further comprise:

a transmit buffer for holding packets to be sent on said transport medium; and means for transmitting said packets on said transport medium before said releasing means releases said transmission right, wherein said releasing means does not release said transmission right if said transmitting means runs out of said packets to transmit unless said second determining means determines that said receive buffer occupancy is lower than said second predetermined occupancy level.

11. A packet switching network according to claim 9 wherein said packet switching network processes code division, multiple access packets.

* * * * *

UNITED STATES PATENT AND TRADEMARK OFFICE
CERTIFICATE OF CORRECTION

PATENT NO. : 5,473,604
DATED : December 5, 1995
INVENTOR(S) : Diana L. Lorenz, Robert F. Shaw, Ronald L. Spanke It is certified that error appears in the above-indentified patent and that said Letters Patent is hereby corrected as shown below:

Column 8, claim 9, line 35, change "a bus arbiter" to -- an arbiter--.

Signed and Sealed this

Ninth Day of July, 1996

Attest:

BRUCE LEHMAN

Attesting Officer

Commissioner of Patents and Trademarks